US007970702B1

(12) United States Patent
Hinchcliff et al.

(10) Patent No.: US 7,970,702 B1
(45) Date of Patent: Jun. 28, 2011

(54) METHOD AND SYSTEM FOR AUTOMATED COLLECTIONS

(75) Inventors: Heidi A. Hinchcliff, Omaha, NE (US); Christopher T. Lunde, Omaha, NE (US)

(73) Assignee: CSG Interactive Messaging, Inc., Omaha, NE (US)

( * ) Notice: Subject to any disclaimer, the term of this patent is extended or adjusted under 35 U.S.C. 154(b) by 1842 days.

(21) Appl. No.: 10/966,871

(22) Filed: Oct. 15, 2004

(51) Int. Cl.
*G06Q 40/00* (2006.01)
(52) U.S. Cl. ............... 705/40; 705/41; 705/35; 705/39
(58) Field of Classification Search ............ 700/1–80; 705/34, 39, 40
See application file for complete search history.

(56) References Cited

U.S. PATENT DOCUMENTS

| | | | | | |
|---|---|---|---|---|---|
| 5,583,778 | A | * | 12/1996 | Wind | 705/34 |
| 5,727,249 | A | * | 3/1998 | Pollin | 705/40 |
| 5,822,400 | A | * | 10/1998 | Smith | 379/32.02 |
| 7,167,839 | B1 | * | 1/2007 | Layne | 705/40 |
| 7,386,102 | B2 | * | 6/2008 | Summe et al. | 379/69 |
| 2003/0033245 | A1 | * | 2/2003 | Kahr | 705/39 |
| 2004/0044554 | A1 | * | 3/2004 | Bull et al. | 705/8 |
| 2004/0088253 | A1 | * | 5/2004 | Crispyn et al. | 705/40 |
| 2005/0175168 | A1 | * | 8/2005 | Summe et al. | 379/266.01 |

OTHER PUBLICATIONS

"Computers streamline debt collection Electronic arsenal targets deadbeats; Final Edition", Leslie Cauley, The Sun. Baltimore, Md. Nov. 7, 1990, p. 1.B.*

* cited by examiner

*Primary Examiner* — Ella Colbert
*Assistant Examiner* — Hai Tran
(74) *Attorney, Agent, or Firm* — Holland & Hart LLP

(57) ABSTRACT

An automated debt collection system receives data relating to debtors and their debts. The system filters the data, according to pre-defined criteria, and contacts debtors who meet the criteria. The system provides interactive messages that enable debtors to make payment commitments, confirm that payments have been made, or make automated payments. Alternately, the system may leave messages for debtors that enable the debtors to contact the system or a client call center regarding remittance of the debt. The system may transfer a debtor to a client call center when necessary. Contact between the system and the debtor may be recorded and data received may be stored and compiled into various reports.

16 Claims, 4 Drawing Sheets

METHOD AND SYSTEM FOR AUTOMATED COLLECTIONS

BACKGROUND OF THE INVENTION

1. Field of the Invention

The present invention relates to methods of debt collection and more particularly to an automated system that contacts debtors on behalf of creditors to secure automated payments, payment commitments or confirm that payments have already been made.

2. Description of the Prior Art

Lenders, such as banks, credit unions, and various financial institutions around the world have dramatically increased the amount of credit being extended to consumers and businesses alike. Businesses large and small have also increased the numbers of credit accounts extended to the public and other businesses. One significant problem with the extension of such credit accounts is delinquency in the payment of accrued balances. As the number of outstanding credit accounts and the associated risks increase, financial institutions and businesses alike are forced to increase their focus on the collections process or risk substantial losses.

A number of options are available for the collection of high-risk and/or past due accounts. Oftentimes, past due accounts are sent to a collection agency, where the creditor of the past due account receives a significant percentage of the amount ultimately collected by the collection agency. Alternately, a business or financial institution may develop its own in-house collections department. However, such ventures are rarely cost effective and don't typically produce efficient results, unless the business or financial institution has substantial resources and a large volume of high-risk and/or past due debtors. Another method of debt collection involves selling the delinquent account to a third party, for a stated price, to collect on the delinquent account. Typically, a creditor will receive a bid for the sale of all delinquent accounts but only within certain categories. Any method chosen by the business or financial institution will cost money and time, not to mention the vast number of credit account defaults and bankruptcies that have cost the credit industry billions of dollars in revenue. These losses in revenue are passed onto the consumer, spawning additional debt and debt delinquency.

There is a significant need for new, efficient and cost effective debt collection systems and methods. However, such systems and methods must optimize the use of collection resources. For example, use of an outbound telemarketing collection resource that uses live personnel to place the calls may result in a certain aggregate payment amount. However, the use of live collection personnel can be quite costly, averaging anywhere from $1.25 to $5.00 or more per call, depending on the collection agent's seniority, unionization and other work parameters. Skilled collections agents are a valuable resource that should only be applied to high-value collections calls. Cheaper collection methods, such as direct mail programs for example, will tend to cost far less than the use of live collections agents but typically produce limited results. Irrespective of the collection method employed, the creditor and the collection resource should be able to apply a filter or screening process in order to better focus the collection efforts according to the creditor's needs at that time.

Accordingly, what is needed is an automated system for assisting in the collection of high-risk and/or past due debts that is effective while remaining relatively inexpensive and simple for a business or financial institution to implement.

SUMMARY OF THE INVENTION

The automated system for assisting in the collection of high-risk and/or past due debts of the present invention is generally provided with a central server, having at least a processor, a data storage medium, and a means for accessing a network, such as the Internet or a publicly switched telephone network (PSTN). Data having contact information for debtors, and information relating to the debts they owe, is provided by clients who require the collection services. Software is provided to be operative on the processor for receiving the debtor information, filtering the information to determine the group or groups of debtors that will be contacted and placing calls to each of the debtors within the groups of debtors.

In one embodiment, the system asks the person who answers the system's call to verify if they are the primary or secondary party responsible for the debt. Where no response is received, or the caller responds that neither the primary nor the secondary party are available, a message may be left that leaves contact information to enable the debtors to call the system at a later time. The system may query the debtors to see if an automatic payment can be made at that time. The debtors may also be asked, where an immediate payment cannot be made, to make arrangements for a scheduled future payment. The system may also permit the debtors to advise that the payment has already been made. Where desirable, the system may connect the debtors with live collections personnel to assist with more complex account or payment issues.

One preferred embodiment of the present invention provides for the recording of the contacts between the system and the debtors, as well as the recording of collection results. This information may be provided to the clients in a real-time manner using a network connection between a client computer device and the system. Such reports may provide valuable screening information to the client, including habitual low-probability of response debtors and the screening of bad debtor contact information.

It is therefore a principal object of the present invention to provide an automated system for contacting debtors and securing commitments for payments against the debts owed.

A further object of the present invention is to provide an automated system for contacting debtors and securing commitments for payments against the debts owed.

Still another object of the present invention is to provide an automated system that contacts debtors and collects payment information through interactive messages.

Yet another object of the present invention is to provide an automated system for contacting debtors having high-risk and/or past due debts that is cost effective and efficient.

A further object of the present invention is to provide an automated debt collection system that provides a cost effective method of screening debtor contact information.

Still another object of the present invention is to provide an automated system for debt collection that provides a cost effective method of placing first calls to early stage delinquent debtors.

Yet another object of the present invention is to provide an automated system for debt collection that provides a cost effective method of placing reminder calls and other low-stress contacts to debtors.

A further object of the present invention is to provide an automated system for contacting debtors having high-risk and/or past due debts that is relatively easy to implement.

Still another object of the present invention is to provide an automated debt collection system that effectively directs non-automated and less cost effective collection resources to those high-risk and/or past due accounts that require the specific assistance of such collection resources.

These and other objects of the present invention will be apparent to those skilled in the art.

DESCRIPTION OF THE PREFERRED EMBODIMENT

In the following detailed description of exemplary embodiments, reference is made to accompanying FIGS. 1 and 2A-C, which form a part hereof and illustrate exemplary embodiments that may be implemented in order to practice the invention. These embodiments are disclosed in sufficient detail to enable those skilled in the art to practice the invention. It should be understood, however, that other embodiments may be utilized and changes may be made to the illustrated embodiments without departing from the spirit or scope of the present invention. The following detailed description is, therefore, not to be taken in a limiting sense and the scope of the present invention is defined only by the appended claims.

Figure 1:
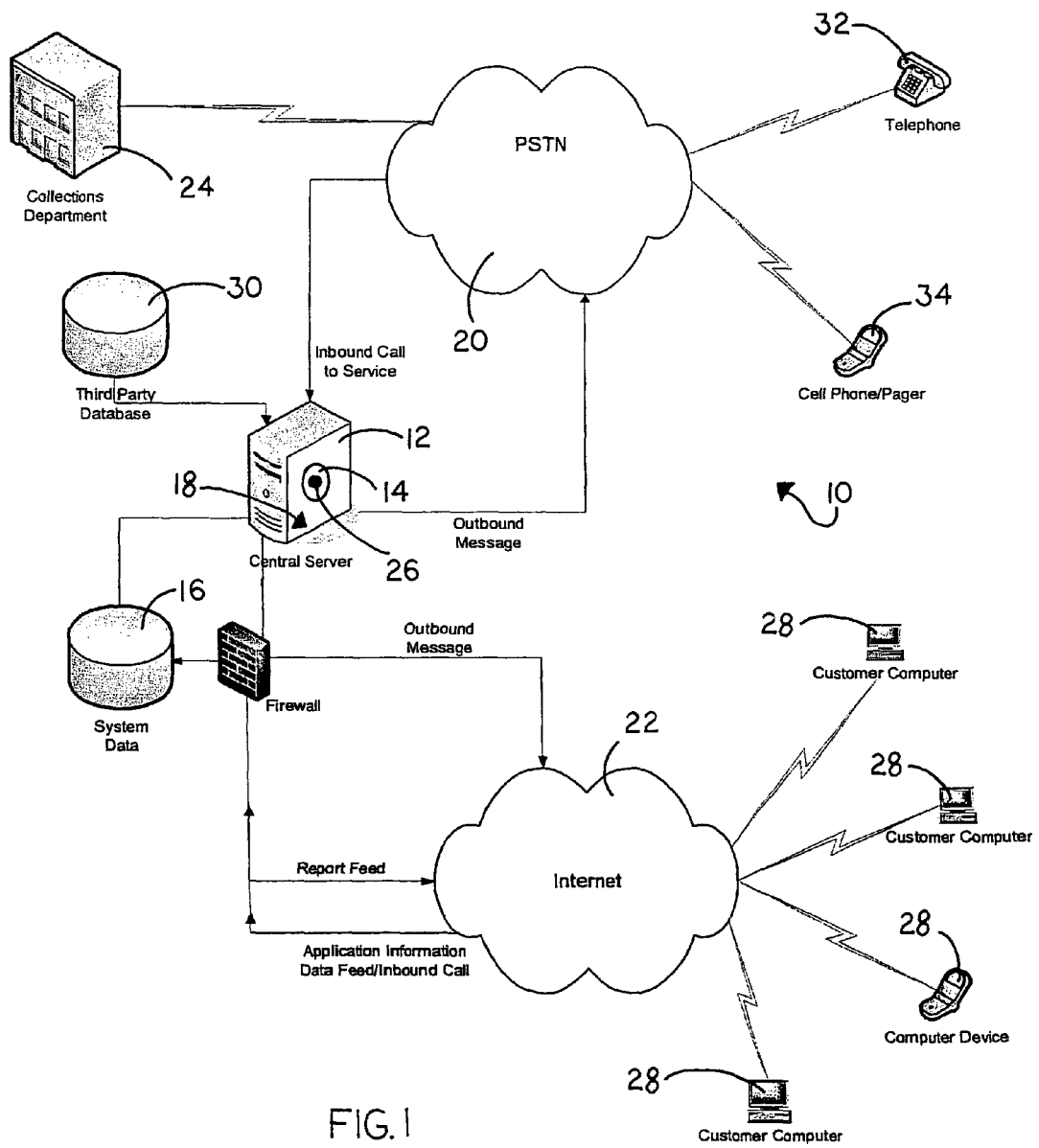
FIG. 1 depicts a general schematic of one embodiment of the system of the present invention.
Figure 2A:
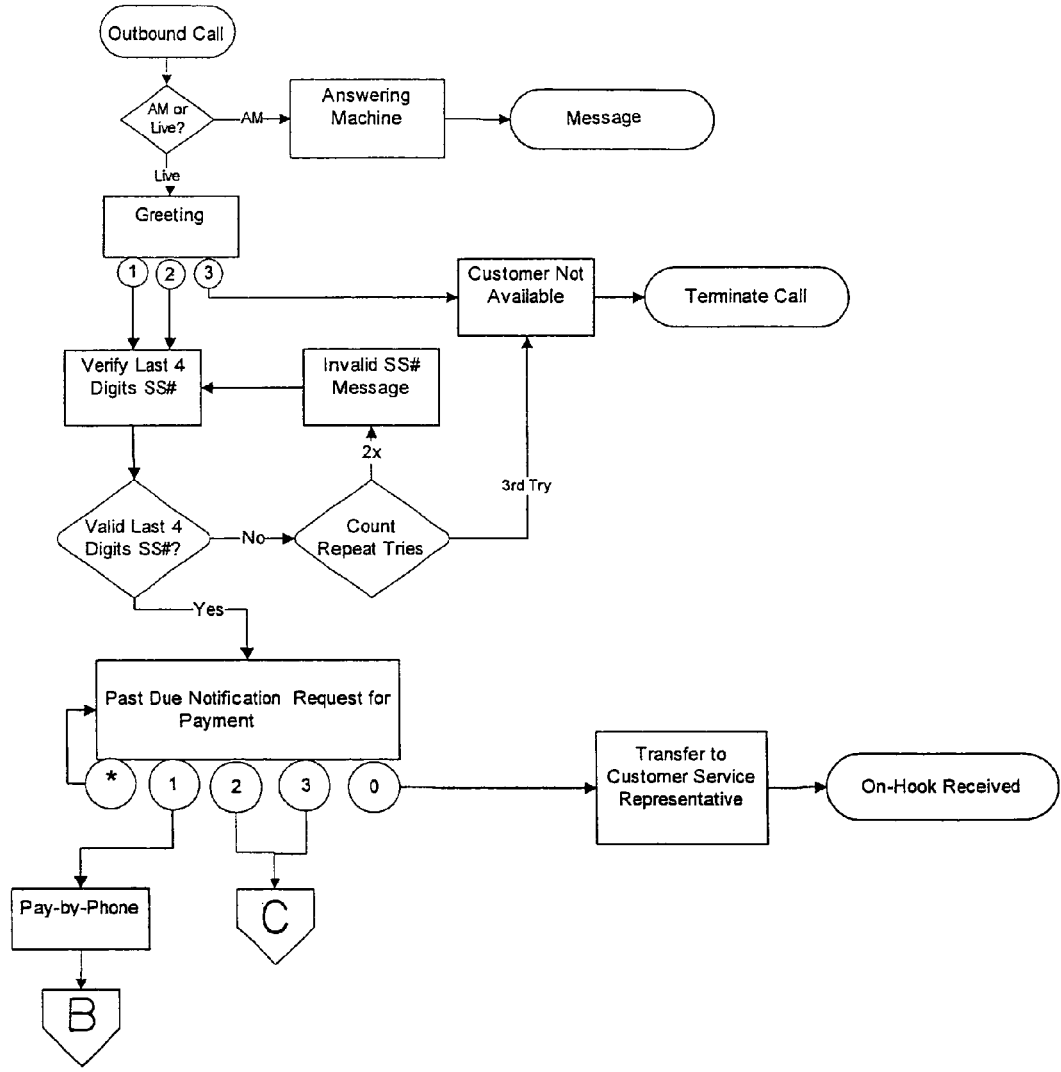
FIGS. 2A-C depict a block flow diagram of one method of implementing the automated debt collection system of the present invention.
Figure 2B:
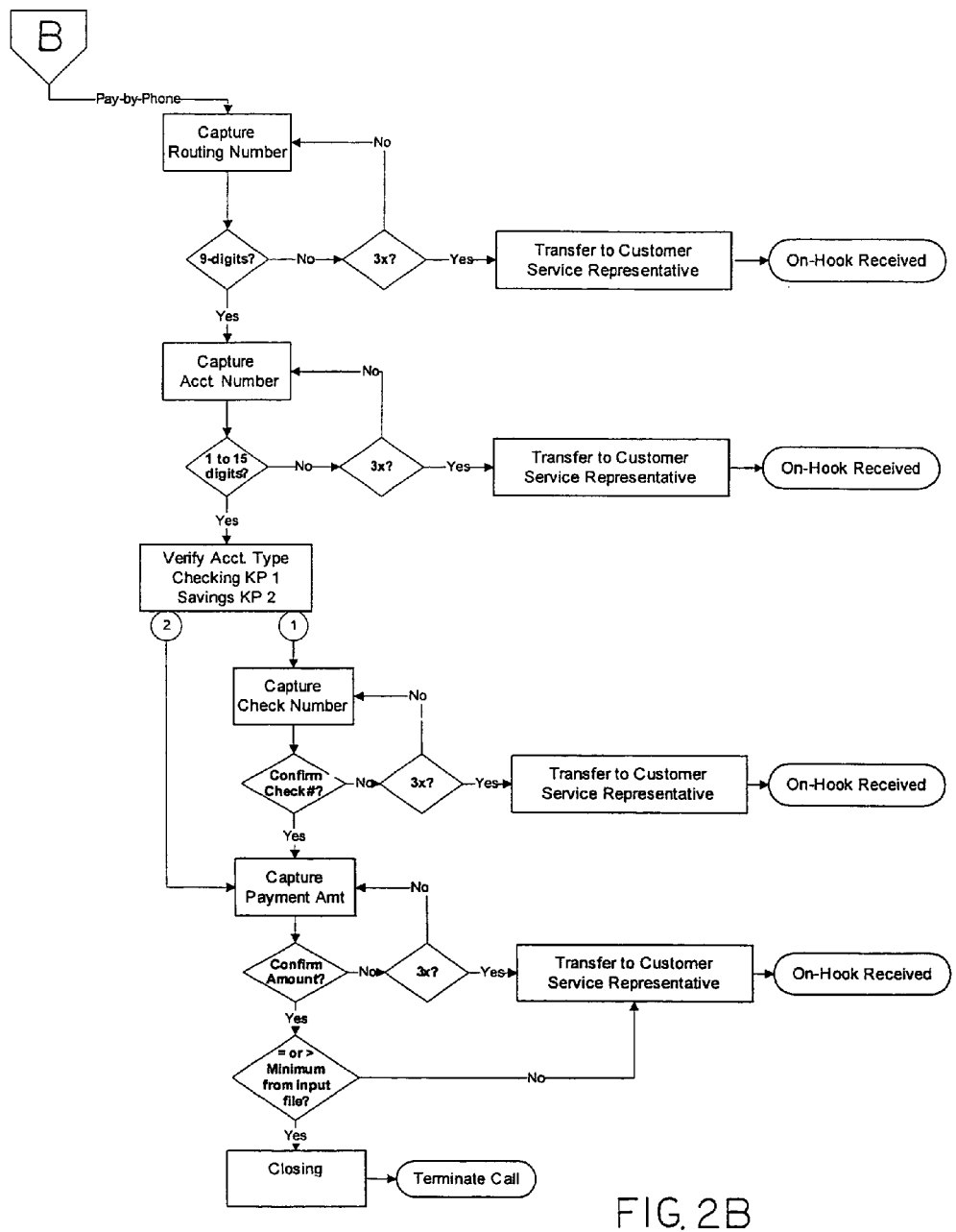
Figure 2C:
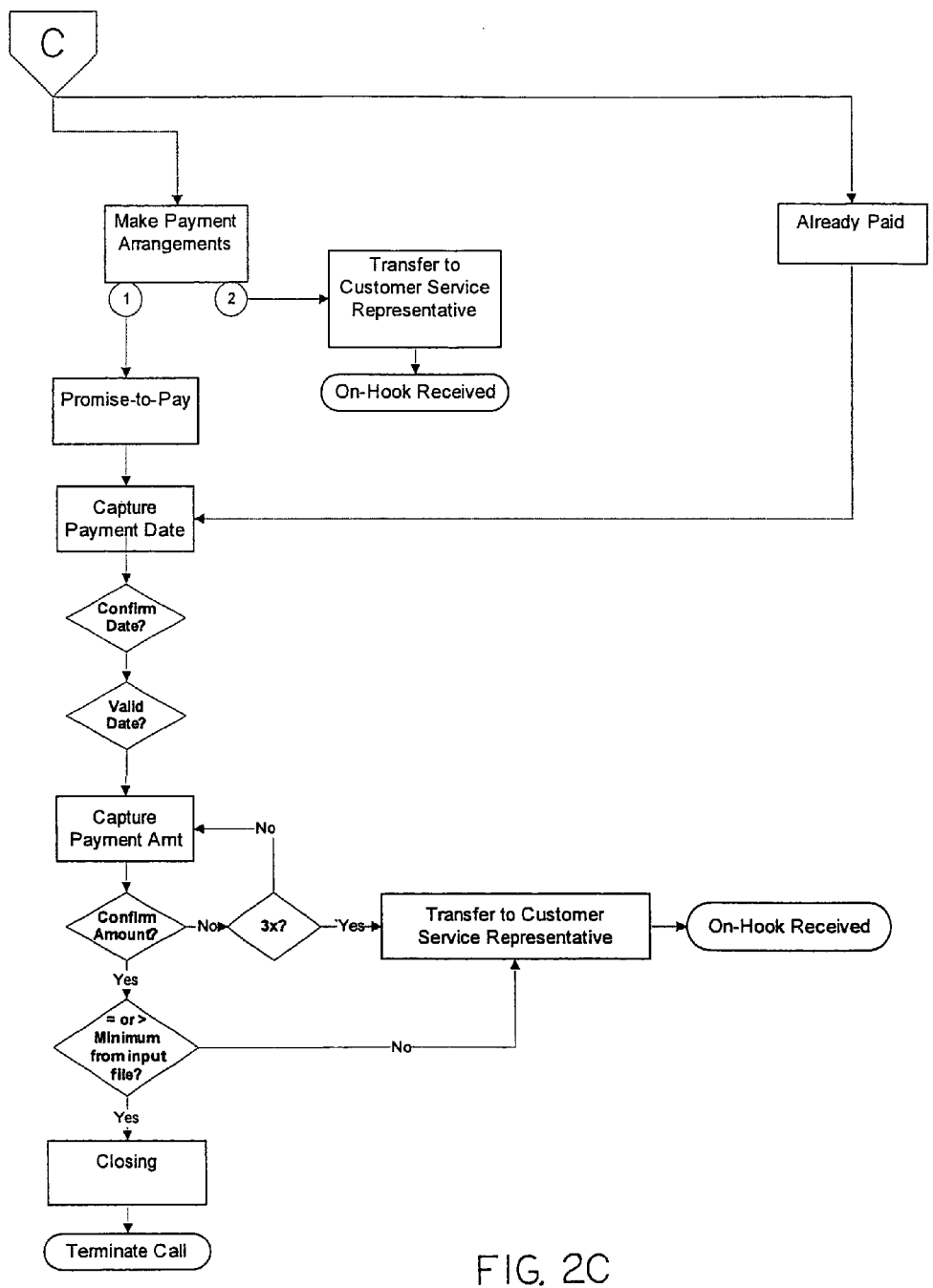

FIG. 1 depicts a system level overview of one embodiment of the method and system for automated debt collection of the present invention. The system 10 is generally comprised of a central server 12 having at least a processor 14, a data storage medium 16 and a means 18 (such as a modem, network card, or other similar interfacing device) for accessing a network, such as a publicly switched telephone network (PSTN) 20, the Internet 22, or other communications links, such as a VoIP. Regardless of the type of communications network accessed by the server 12, it is contemplated that the network connection could be made via landline or wireless connections.

Operating software 26 is provided to be operative on the processor 14. The software 26 enables the server 12 to receive data, including debtor contact information and specific information relating to the debts owed, from one or more clients. Client data may be transmitted from client computer devices 28, such as personal computers, laptops, host systems, and the like, or a third party database 30 over a network to which the server 12 is connected. It is contemplated that the client data could also be forwarded to the server 12 by mailing or delivering data storage media, such as diskettes or CD's that are readable by the server 12 or a separate workstation coupled with the server 12.

In a preferred embodiment, the system 10 will be capable of receiving a set of pre-defined criteria that may be used to "filter" or "pre-screen" the data received from the clients. The software 26 may be provided to select one or more particular groups of debtors to be contacted by the system 10. The portions of the data not selected by the software 26 may simply be stored for future use or, when directed by the client, purged from the system 10. Some examples of pre-defined criteria may include the length of time that the debt has been due and/or delinquent, such as debts ranging from sixty to ninety days past due. The software 26 may also recognize high-risk accounts based on certain credit profile information, debt amount or other such high-risk identifiers. The type of pre-defined criteria is nearly limitless and can be used to custom tailor a collections or notification campaign according to the client's needs. The criteria may be modified as the campaigns progress, depending on the results achieved by the system 10 using criteria initially provided by the clients. The use of such a filter will further focus the collection resources utilized and provide a greater efficiency to the system 10 as a whole.

The system 10 accesses a network to contact each debtor. FIGS. 1 and 2A-C depict an example where the network is a PSTN 20 and the server 12 is programmed to contact each debtor using the debtors' telephone 32 or other communications device 34, such as a cell phone, paging device or PDA. It is also contemplated that the debtor can be contacted over the Internet. In the example depicted, the system 10 places an outbound call using the debtor's contact information. The software 26 is operative to wait for the line to go off the hook, wherein an audible (or visual, depending upon the applicant device being contacted) greeting, such as, "This is First Prairie Credit calling with important information about your account." Preferably, the software 26 is operative to receive a response from the applicant in the form of DTMF tones, speech, or other formats of data transmission, identify the format of the transmission and respond in an appropriate format. Accordingly, it is contemplated that various forms of text-to-speech, speech recognition and DTMF tone recognition applications may be incorporated with the software 26. However, for purposes of simplicity only, the examples of contact between the system 10 and the debtors will be described herein as using DTMF tone recognition and certain text-to-speech protocols.

In one preferred embodiment, the system 10 may ask, "If this is John Doe, please press one, or if this is Jane Doe, please press two. If neither John or Jane Doe are available, press three." The software 26 will be provided to recognize such specific responses and proceed accordingly. Where no response is received by the system 10, or an input other than those offered by the system 10 is detected, the system 10 may reply, "I am sorry. That is not a valid selection." After a predetermined number of chances the system 10 should simply terminate the call, stating, "We look forward to serving you in the future. Thank you." Where the number 3 is selected in this particular example, the system 10 may provide a message, such as "Please ask John Doe to call us back at 1-800-888-3151. Thank you."

In a preferred embodiment, where the debtor responds that he or she is the primary or secondary named party responsible for the account, the software 26 may be provided to present an identity question to the debtor, using information provided by the client that is unique to the debtor. In that example, the system 10 may ask the debtor to simply enter the last four digits of the debtor's social security number. The software 26 will receive the debtor's response and verify the response with the data received from the client. Where the system 10 determines that the response does not match the data, the software 26 requeries the debtor. Where continued incorrect responses are received by the system 10, the call may be terminated. However, where a correct response is received by the system 10, the system 10 will continue forward through its predetermined call flow.

In the present example, the system 10 may advise the debtor that the call is being recorded and state, "We are calling to inform you that your credit card account is $193 past due." A countless number of script variations are contemplated. For example, the client may prefer that no data fields be provided relating to specific debt amounts or the name of the debt holder. The system may request that a payment be made or simply advise the total amount due at that time. The system may continue with the call, prompting, "To make an automated payment right now by telephone, press one. If you are unable to pay today, but can schedule a future payment, press two. If you have already submitted your payment, press three. To hear this message again, press the star key."

If the debtor selects the number 1, the system may advise the debtor that, "we are getting ready to transfer you to the First Prairie Credit automated payment system. In order to process your payment, you must have your account number ready. If you have your account number ready, press 1. If you would like to pay, but need a moment to locate your account number, press 2. If this is not a convenient time for you and you'd like us to call back, please press 3." The software 26 will await the response from the debtor and respond accordingly. For example, if the debtor wishes to pay by phone and selects the number 1, the system may advise the debtor that a payment may be made from the debtors checking or savings account to pay the existing debt or any part thereof. In a preferred embodiment, the system will then ask the debtor to enter the nine-digit bank routing number for the debtor's bank, followed by the pound key. In one preferred embodiment, the system may confirm the account number information received from the debtor by repeating the routing number received by the system 10, using a text-to-speech response. The system 10 will then typically ask the debtor to provide a specific response, such as entering the number 2, if the information is correct. The debtor is then asked to enter its account number, which is then verified by the system 10. The system 10 may then ask the debtor to press the number 1 if the account is a checking account and press 2 if the account is a savings account. Thereafter, the system 10 will ask the debtor to enter the payment amount, which will be verified with the debtor. Once the payment is verified, the system simply thanks the debtor and terminates the call.

Where, during the previous options menu, the debtor needs a moment and selects the number 2, the system may simply advise the debtor to "press the 8 key when you are ready to continue." Preferably, the system 10 will repeat such a message every few seconds, with a time out of a minute or two. Where the debtor selects the number 3 because it is not a convenient time, the system may simply advise the debtor to "please call us back at 1-800-888-3151 when you have your account number available. Thank you." The system would then simply terminate the call.

If, in the previous menu, the debtor selects the number 2 in order to schedule a future payment, the system may advise, "We are getting ready to transfer you to the First Prairie Credit automated system. In order to process your future payment, you must have your account number ready. If you have your account number, press 1. If you would like to make a future arrangement, but need a moment to locate your account number, press 2. If this is not a convenient time for you and you would like to call us back, please press 3." The software 26 will be programmed to receive the debtor's response and respond accordingly in a manner to that described previously hereinabove. In another preferred embodiment, depicted in FIG. 2C, the debtor may simply be asked to press the number 1 to make an automatic payment or press 2 to be connected to a customer service representative. Where the debtor selects the number 1, in order to make a future payment commitment, the system 10 may ask the debtor to enter the payment amount, followed by the pound key. The system 10 will confirm the information entered by the debtor using a text-to-speech response. If the information is correct, the system 10 will thank the debtor and terminate the call after confirming the scheduled payment amount and date. If the debtor selects the number 2, the system will simply connect the debtor with a customer service representative 24.

If in the previous menu relating to remittance, the debtor selects the number 3 because a payment has already been made, the system may simply thank the debtor for the payment and terminate the call. It is contemplated that, when the debtor provides an invalid or non-responsive response to any menu the system presents to the debtor, the system may simply advise the debtor that the response was invalid and repeat the menu choices to the debtor.

It is contemplated that the system 10 may be unable to reach the debtors directly. However, when the system 10 reaches an answering machine or voice mail account for the debtor, the software 26 should be capable of leaving a message to the debtor. An example of one such message may state "Hello, this is First Prairie Bank calling with important account information for John Doe or Jane Doe. Please call us at 1-800-888-3151, that number is 1-800-888-3151. Thank you." The system 10 should therefore be provided in a manner that is capable of receiving inbound calls from debtors. Typically, the system 10 will receive the inbound calls or other types of communications over a network, such as those described previously. However, where the debtors call the system 10, the software should be provided to present the debtors with remittance options, similar to those discussed hereinabove. It is also contemplated that debtors may call to correct certain contact or account information or report other issues that are more complex than a simple remittance or promise for a future payment. In such an instance, the system 10 should be provided with a means of simply transferring the call over a network to a live representative 24, previously designated by the client. The representative may be a third party collections department, an in-house representative with the client, or the like.

Data relating to the system's contacts with the debtors may be stored, at least temporarily, on the data storage medium 16. The software 26 may be provided to formulate such data into individual reports to be provided to the clients. It is also contemplated that the clients could be provided with access to such data and reports over the network to which the server 12 is connected, such as the Internet 22 for example, a data link or the like. When desirable, the software 26 may be provided to record the contact between the system 10 and the debtor, including questions and messages transmitted by the system 10 to the applicant and any responses received thereto. These recordings may be stored on the data storage medium 16 along with time and date information relating to each recording. The system 10 is preferably capable of selectively replaying the recordings for the client and/or transmitting copies of the recordings to the clients, when necessary.

In the drawings and in the specification, there have been set forth preferred embodiments of the invention and although specific items are employed, these are used in a generic and descriptive sense only and not for purposes of limitation. Changes in the form and proportion of parts, as well as a substitution of equivalents, are contemplated as circumstances may suggest or render expedient without departing from the spirit or scope of the invention as further defined in the following claims.

Thus it can be seen that the invention accomplishes at least all of its stated objectives.

We claim:

1. An automated system for assisting in the collection of high-risk or past due debts from one or more debtors, comprising:
   a processor;
   a data storage medium operatively coupled with said processor that is capable of at least temporarily storing debtor data provided by one or more clients;
   means for accessing an electronic network operatively coupled with said processor; and
   at least one computer readable medium operatively coupled with said processor and said data storage medium; said at least one computer readable medium comprising:

a) software to receive debtor data from one or more clients that includes the names of debtors, contact information relating to said debtors and specific debts owed by said debtors;
b) software to filter said debtor data, according to predefined parameter's, to select debtors to be contacted;
c) software to initiate contact with debtors, who were selected during said filtering step, over said electronic network;
d) software to query said debtors about a remittance for the debts; and
e) software to receive a response from said debtors, regarding said query, and at least temporarily store said response on said data storage medium.

2. The system of claim 1 wherein said, at least one computer readable medium further comprises:
software to confirm said debtors' identity, prior to querying said debtors about a remittance for the debts.

3. The system of claim 1 wherein said query includes offering the debtors the opportunity to make an automatic payment toward the debts.

4. The system of claim 1 wherein said query includes offering the debtors the opportunity to make a commitment for a future payment toward the debts.

5. The system of claim 1 wherein Said query includes asking said debtors if a payment has already been made toward the debts.

6. The system of claim 1 wherein said query includes offering the debtors, the options of either making an automatic payment toward the debts or making a commitment for a future payment toward the debts.

7. The system of claim 1 wherein said query includes offering the debtors the options of either making an automatic-payment toward the debts, making an commitment for a future payment toward the debts, or reporting that a payment has already been made toward the debts.

8. The system of claim 1 wherein said at least one computer readable medium further comprises:
software to put said debtors in communication with a customer service representative.

9. The system of claim 1 wherein said at least one computer readable medium further comprises:
software to query said debtors regarding their identities.

10. The system of claim 9 wherein said at least one computer readable medium further comprises:
software to leave a message for said debtors, when the system does not receive an affirmative response to said query regarding the debtors' identities.

11. The system of claim 10 wherein said query includes offering the debtors the options of making an automatic payment toward the debts.

12. The system of claim 10 wherein said query includes offering the debtors the options of dither making an automatic payment toward the debts or making an commitment for a future payment toward the debts.

13. The system of claim 10 wherein said query includes offering the debtors the options of either making an, automatic payment toward the debts, making an commitment for a future payment toward the debts, or reporting that a payment has already been made toward the debts.

14. The system of claim 13 wherein said at least one computer readable medium further comprises:
software to record communications over said electronic network between the system and said debtors.

15. The system of claim 14 wherein said at least one computer readable medium further comprises:
software to provide said one or more clients with reports regarding communications between the system and said debtors.

16. The system of claim 14 wherein said at least one computer readable medium further comprises:
software to put said debtors in communication with a customer service representative.

* * * * *